Jan. 25, 1927.
L. H. KAUPKE
1,615,630
DRAFT CONNECTION
Filed Sept. 13, 1919
2 Sheets-Sheet 1
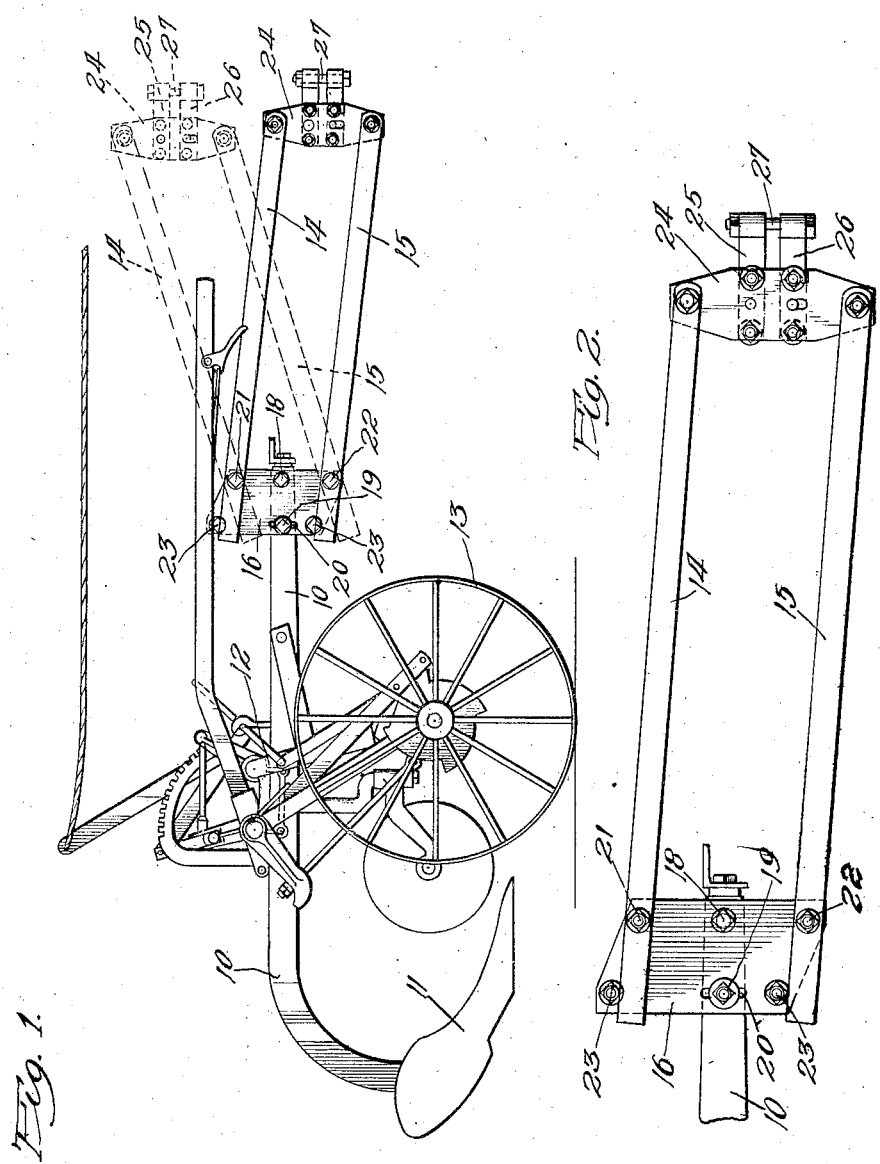

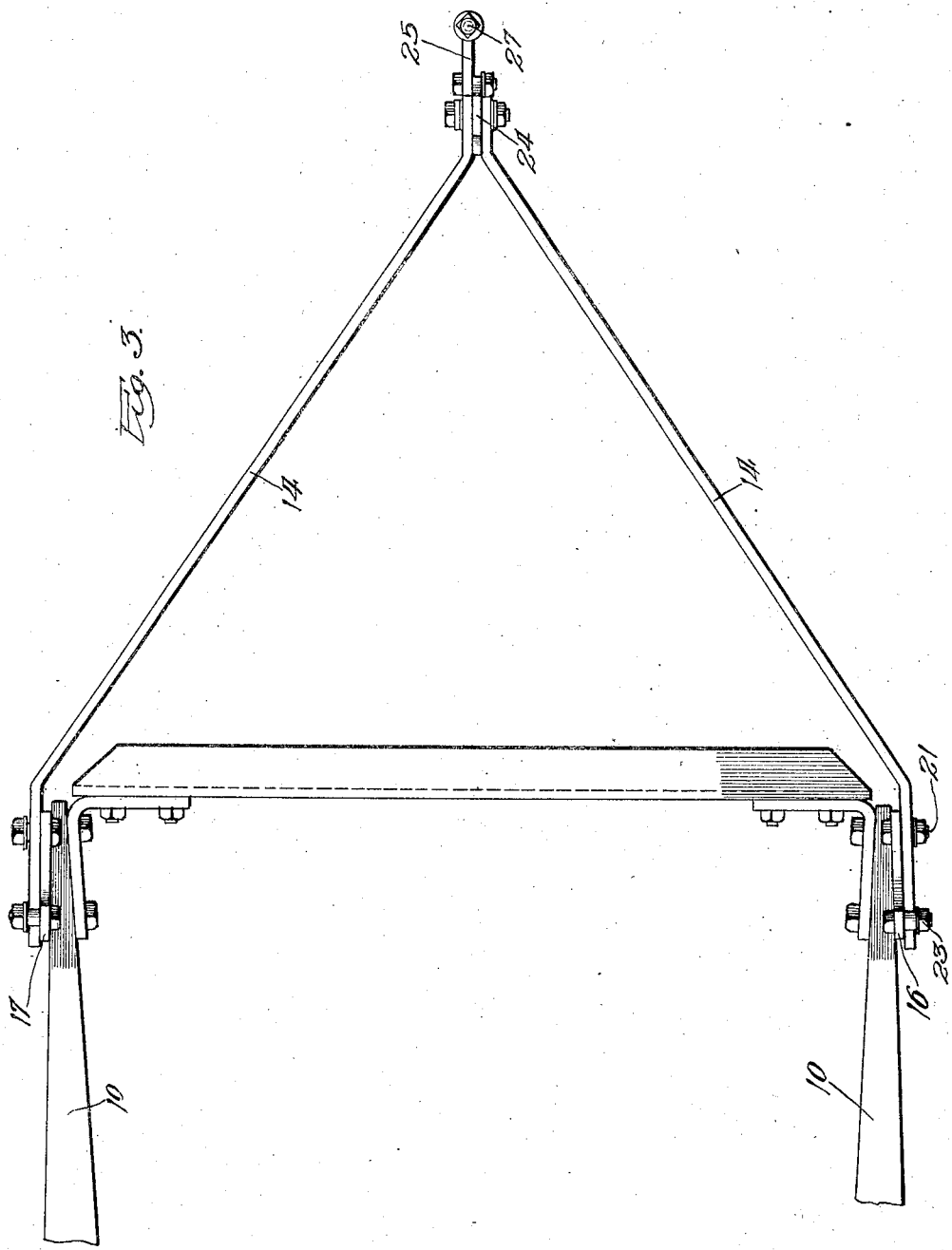

Patented Jan. 25, 1927.

1,615,630

UNITED STATES PATENT OFFICE.

LEE H. KAUPKE, OF ROCK ISLAND, ILLINOIS, ASSIGNOR TO ROCK ISLAND PLOW COMPANY, OF ROCK ISLAND, ILLINOIS, A CORPORATION OF ILLINOIS.

DRAFT CONNECTION.

Application filed September 13, 1919. Serial No. 323,486.

My invention relates to an improvement in draft connections for use in connection with agricultural implements, such as plows and listers, and has for its object the provision of a hitch which operates to maintain the plows substantially parallel to the ground while they are being raised or lowered. My invention is particularly adapted for use in connection with plows or listers in which the plow beams are supported by a ground-wheel and a furrow-wheel, and in which the beam is raised by rocking the crank axle and in which no supporting wheel is provided for the rear end of the beam.

I have illustrated my invention particularly in connection with a power-lift lister of the type shown in my application Serial No. 309,054, filed July 7, 1919, in which the rear wheels and seeding device have been omitted so that the implement can be employed as a cultivator.

Figure 1 is a side elevation of a cultivator having my improved draft device attached thereto.

Fig. 2 is an enlarged side elevation of the draft device.

Fig. 3 is a plan view of the forward part of the implement showing the draft device.

I have shown diagrammatically a lister comprising plow beams 10 carrying the plow bodies 11, which plow beams are mounted on the crank axle 12, on the ends of which the ground-wheels 13 are supported. In order to raise and lower the plow beams, I have indicated certain power-lift mechanism —that is, mechanism which is operated by power derived from the ground-wheels for rocking the crank axle to thereby raise and lower the plow. The specific means illustrated are those shown in my co-pending application Serial No. 309,054, above referred to, and as they form no part of my present invention, as any suitable means can be employed for raising and lowering the plow beams, it is not thought necessary to describe the same in detail.

The feature of my present invention resides in the parallel hitch or draft connection which is secured to the front ends of the plow beams. This hitch consists essentially of two pairs of parallel arms or links 14, 15. One pair of these arms are pivotally connected near their rear ends to a plate 16 secured to the forward end of one of the plow beams 10, while the other pair of pivoted arms are correspondingly pivoted to a second plate 17, secured to the forward end of the other plow beam. As clearly shown in Fig. 2, these plates are secured to the plow beam by the bolts 18, 19, the bolt 19 engaging with a slot 20 in the plate 16, whereby the position of the plate on the plow beam can be adjusted for a purpose hereinafter pointed out. The arm 14 is pivotally connected to the plate by means of the bolt 21 located above the plow beam, while the other arm 15 is similarly pivoted on the bolt 22 located in the lower part of the plate 16 and below the plow beam. Passing through the plate 16, near its rear end, are a pair of bolts 23 which form stops with which the inner ends of the arms 14, 15, are adapted to engage in a manner to be hereinafter described. The parallel arms 14, 15, extend forwardly and converge inwardly, being connected at their forward ends to the draft plate 24, the arms 14 being pivotally connected to the upper end of this plate, and the arms 15 being pivotally connected to the lower end of this plate. Secured to this draft plate, intermediate the arms 14, 15, are a pair of draft arms 25, 26, the forward ends of which are connected together by a draft pin 27 to which the draw-bar of the tractor may be connected. The draft arm 26 is adjustably connected to the plate 24 by means of the slotted connections, clearly shown in Fig. 2, so that this draft plate can be adjusted for use with different draw bars.

In Fig. 1, I have shown in dotted lines the relative position of the draft arms to the plow beams when the beams are in lowered position, and in full lines the relative position of the same parts when the beams are raised. The draft connection to the draw-bar of the tractor, of course, is always maintained at a stationary height, the swinging movement of the arms 14, 15, from the dotted to the full line positions in Fig. 1, being brought about by the upward movement of the plow beams, as the same are raised. Thus, assuming that the plow beams are in their lowered positions and the plows thus in the ground, the draft arms 14, 15, occupy the relative position shown in dotted lines in Fig. 1. As the plows are raised, the plate 16 is moved vertically, thereby swinging the arms 14, 15, about the pivot bolts 21, 22, these parallel links at this time operating to cause the rear end of the beam to be raised parallel with the forward end of the beam, thus maintaining the level of the plow body during this raising movement. When the beams have reached their upper limit of movement, the inner ends of the arms 14, 15, strike the stops 23 on the inner ends of the plate 16, thereby forming a lock for movement one way of the parallelogram, thus relieving the undue strain on this parallelogram due to the weight of the machine extending to the rear of the axle, and tending to take the slack out of the hitch connections to the tractor. When arms 14 and 15 strike the stops 23, they simply limit the upward movement of the front end of the beam. The plate 16 is adjustably connected with the beam 10 by means of the bolt 19 engaging in the slot 20. By reason of this adjustment, the angular position of the plow beam and the plow body carried thereby, with respect to the draft connection, can be varied and thus the "suck" of the plow body adjusted. When the beam 10 is adjusted so that the bolt 19 engages in the upper portion of the slot, the plow body has a greater amount of "suck," and when in the bottom of the slot it has a lesser amount.

While I have illustrated and described my invention in connection with one form of implement, it will be understood that my improved hitch is adapted for use in connection with other implements in which plow beams are raised and lowered, and further that various changes and modifications may be made in the specific structure of my improved hitch or draft connection without departing from my invention.

What I claim as my invention is:—

1. In an agricultural implement, a plow body, ground wheels, means for raising and lowering said plow body relative to the ground wheels, and means for connecting the forward end of said plow body directly to a tractor, comprising a pair of vertically-spaced parallel bars connected at their rear ends to a rear connecting member by horizontal pivots, and connected at their forward ends by horizontal pivots to a front connecting member.

2. In an agricultural implement, a plow body, ground wheels, means for raising and lowering said plow body relative to the ground wheels, and means for connecting the forward end of said plow body directly to a tractor, comprising two pairs of vertically spaced parallel bars, each pair connected at their rear ends to a rear connecting member by horizontal pivots, said pairs converging forwardly and connected at their forward ends to a front connecting member by horizontal pivots.

3. In an agricultural implement, a plow body, ground wheels, means for raising and lowering said plow body relative to the ground wheels, means for connecting the forward end of said plow body directly to a tractor, comprising a pair of vertically spaced parallel bars connected at their rear ends to a rear connecting member by horizontal pivots, and connected at their forward ends to a front connecting member by horizontal pivots, said front connecting member being provided with a vertically disposed pivot pin adapted for swivelling connection with a tractor.

4. In an agricultural implement, a plow body, ground wheels, means for raising and lowering said plow body relative to the ground wheels, means for connecting the forward end of said plow body directly to a tractor, comprising a pair of vertically spaced parallel bars connected at their rear ends to a rear connecting member by horizontal pivots, and connected at their forward ends to a front connecting member by horizontal pivots, and means for angularly adjusting said rear connecting member relative to said plow body.

5. In an agricultural implement, a plow body, ground wheels, means for raising and lowering said plow body relative to the ground wheels, means for connecting the forward end of said plow body directly to a tractor, comprising a pair of vertically spaced parallel bars connected at their rear ends to a rear connecting member by horizontal pivots, and connected at their forward ends to a front connecting member by horizontal pivots, said front connecting member being provided with a vertically disposed pivot pin adapted for swivelling connection with a tractor, and means for angularly adjusting said rear connecting member relative to said plow body.

Signed by me at Rock Island, Illinois, this 21 day of August, 1919.

LEE H. KAUPKE.